US009785927B2

(12) United States Patent
Chen et al.

(10) Patent No.: US 9,785,927 B2
(45) Date of Patent: Oct. 10, 2017

(54) TELEPHONIC PAYMENT PROCESSING METHOD FOR ONLINE SERVICES

(75) Inventors: Shenchang Eric Chen, Los Gatos, CA (US); Herbert Samuel Levitin, Santa Barbara, CA (US)

(73) Assignee: Persony, Inc., Los Gatos, CA (US)

( * ) Notice: Subject to any disclaimer, the term of this patent is extended or adjusted under 35 U.S.C. 154(b) by 2514 days.

(21) Appl. No.: 11/934,735

(22) Filed: Nov. 2, 2007

(65) Prior Publication Data
US 2008/0107248 A1    May 8, 2008

Related U.S. Application Data

(60) Provisional application No. 60/864,112, filed on Nov. 2, 2006.

(51) Int. Cl.
| H04L 12/66 | (2006.01) |
| G06Q 20/12 | (2012.01) |
| H04N 21/258 | (2011.01) |
| G06Q 30/06 | (2012.01) |

(52) U.S. Cl.
CPC ....... *G06Q 20/1235* (2013.01); *G06Q 20/123* (2013.01); *G06Q 30/0633* (2013.01); *H04L 12/66* (2013.01); *H04N 21/25816* (2013.01); *G06Q 2220/10* (2013.01); *G06Q 2220/12* (2013.01); *G06Q 2220/123* (2013.01)

(58) Field of Classification Search
USPC ..................................................... 705/14.66
See application file for complete search history.

(56) References Cited

U.S. PATENT DOCUMENTS

| 5,815,665 | A  | * | 9/1998  | Teper et al. ............... 709/229 |
| 6,014,651 | A  | * | 1/2000  | Crawford ................. 705/400 |
| 6,320,947 | B1 | * | 11/2001 | Joyce .................... G06Q 20/00 379/112.01 |
| 6,381,316 | B2 | * | 4/2002  | Joyce et al. ............... 379/114.2 |
| 6,594,692 | B1 | * | 7/2003  | Reisman ................. 709/219 |
| 6,611,862 | B2 | * | 8/2003  | Reisman ................. 709/217 |
| 6,658,464 | B2 | * | 12/2003 | Reisman ................. 709/219 |
| 6,665,392 | B1 | * | 12/2003 | Wellner ............. H04L 12/1818 370/261 |
| 7,080,051 | B1 | * | 7/2006  | Crawford ................. 705/400 |
| 7,221,929 | B2 | * | 5/2007  | Lee ................. G06Q 20/28 379/114.28 |
| 7,555,458 | B1 | * | 6/2009  | Felger ..................... 705/38 |
| 7,617,114 | B1 | * | 11/2009 | Tooke, III ............. G06F 19/327 705/2 |
| 2002/0046299 | A1 | * | 4/2002 | Lefeber ................. H04L 29/06 719/318 |
| 2002/0129282 | A1 | * | 9/2002 | Hopkins ................. H04L 67/04 726/6 |

(Continued)

*Primary Examiner* — Mamon Obeid
*Assistant Examiner* — El Mehdi Oussir
(74) *Attorney, Agent, or Firm* — Sheridan Ross P.C.

(57) ABSTRACT

According to an embodiment, access to an online resource is enabled by associating a telephony number with a network resource that is made available at a network location, where network resource is protected so as to be inaccessible without access being provided for users individually. A particular user may be detected in initiating a telephony session using the number. Access to the network resource may be activated or authorized for the particular user in response to detecting the user initiating the telephony session.

13 Claims, 4 Drawing Sheets

(56) References Cited

U.S. PATENT DOCUMENTS

| | | | |
|---|---|---|---|
| 2003/0028892 A1* | 2/2003 | Gewickey | H04N 21/23614 725/110 |
| 2003/0097444 A1* | 5/2003 | Dutta | H04L 63/0853 709/225 |
| 2003/0195846 A1* | 10/2003 | Felger | 705/40 |
| 2003/0195847 A1* | 10/2003 | Felger | 705/40 |
| 2003/0195848 A1* | 10/2003 | Felger | 705/40 |
| 2004/0078341 A1* | 4/2004 | Steichen | G06Q 30/06 705/64 |
| 2004/0083114 A1* | 4/2004 | Yue | G06Q 10/10 709/219 |
| 2005/0163105 A1* | 7/2005 | Naick | H04L 29/06027 370/352 |
| 2005/0261965 A1* | 11/2005 | Eisen | G06Q 10/107 705/14.4 |
| 2005/0261970 A1* | 11/2005 | Vucina et al. | 705/16 |
| 2006/0019632 A1* | 1/2006 | Cunningham | G06Q 30/00 455/408 |
| 2007/0255799 A1* | 11/2007 | Forbes | G06F 17/30876 709/217 |

\* cited by examiner

TELEPHONIC PAYMENT PROCESSING METHOD FOR ONLINE SERVICES

RELATED APPLICATIONS

This application claims benefit of priority to Provisional U.S. Patent Application No. 60/864,112, entitled "Phone-Based Payment Processing Method for Online Services," filed Nov. 2, 2006, and naming Shenchang Chen as inventor. The aforementioned priority application is hereby incorporated by reference in its entirety for all purposes.

TECHNICAL FIELD

The disclosed embodiments relate generally to the field network services. In particular, the disclosed embodiments relate to a system and method for enabling telephonic payment processing method for online services.

BACKGROUND

With the increasing availability of broadband and multimedia, the Internet has transformed from merely a medium for selling offline goods to a channel for delivering online contents and services. Examples of online contents or services include streaming video, radio, music, digital photos, adult content, Web conferencing, e-books, e-magazines, search services, educational services, blogs, etc. Many of these services require subscription or pay-per-use fees, often made with a credit card.

Existing payment services, such as PAYPAL, act as a trusted third-party between a customer and a merchant. Such payment services are primarily designed for goods to be fulfilled offline. They have similar fees and steps as a credit card service for each transaction. However, such existing services do not provide metering and session control to charge a fee based on the length of a service.

DETAILED DESCRIPTION

Figure 1:
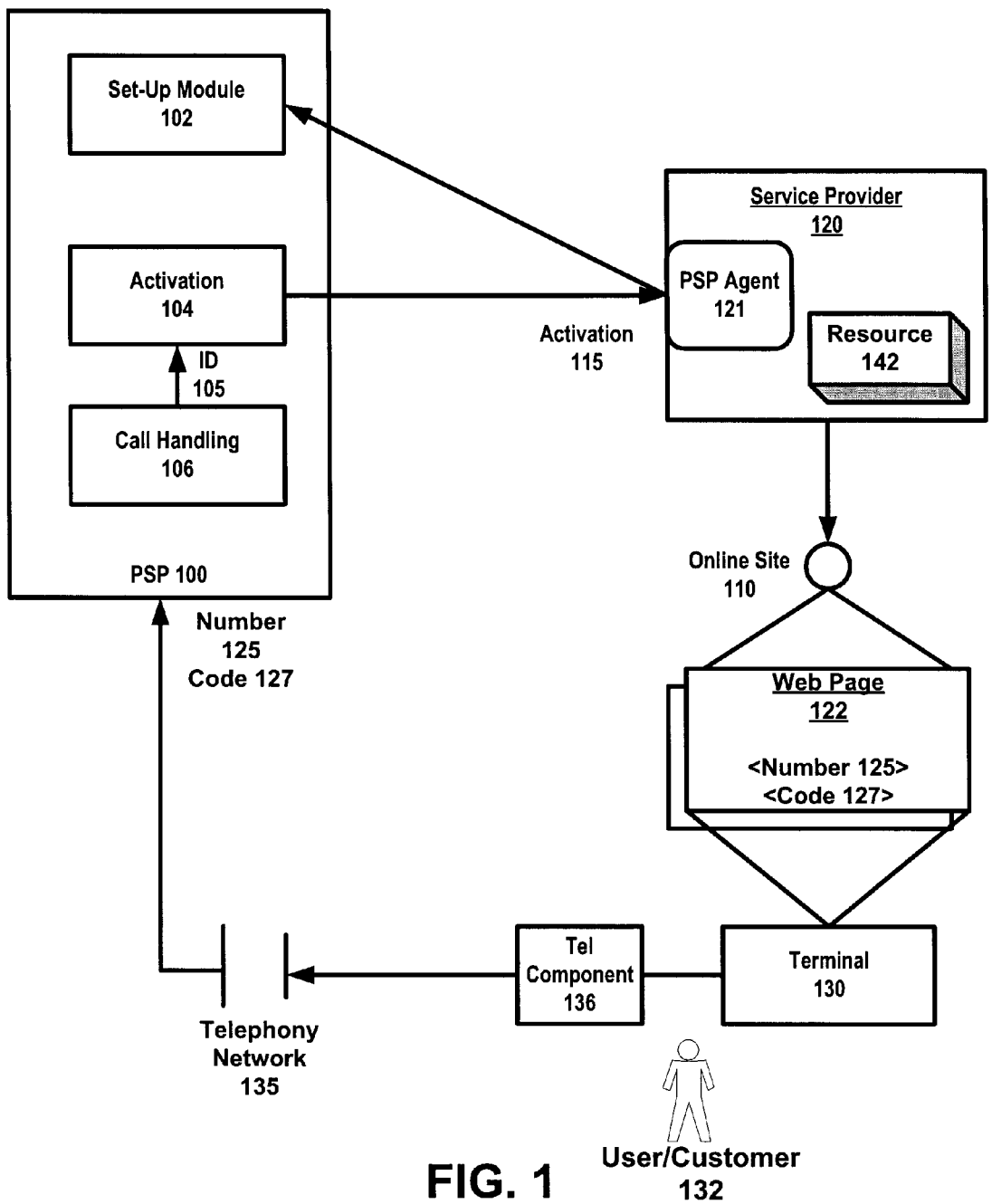
FIG. 1 illustrates a system diagram for use with an embodiment of the invention.

Embodiments described herein improve upon many facets of conventional online processing methods and systems. For example, existing online payment methods often do not meet the needs of fee-based online services, which require simple access authorization, metering of session length, charging fees based on the length of the service, and efficient handling of micro-payments.

Accordingly, a telephonic of phone payment processing system and method is presented that allows a user to access and pay for online service (e.g. content or service) through placement of a phone call. In an embodiment, a customer of an online payment service such as described herein may access and pay for any affiliated online service (e.g. content provided) through placement of a phone call. The payment service may charge and collect fees from the customer based on the pricing and duration of the phone call. These fees may be shared or distributed with the affiliated online service.

In an embodiment, a customer may access the affiliated online service for a given duration of time, and payment for the affiliated online service may be based on the duration of the call. Still further, an embodiment provides that rights to access or receive, content or other resources may extend for the duration of the call.

As an alternative, the service may be provided on a flat-rate basis, and available for a time period after the call is made. For example, a customer may pay for a toll using pre-paid credits or monthly payments to the proprietor of the account, or to a partner of the proprietor.

Among other benefits, embodiments described herein enable the customer to pay for access/service or resources without having to establish a financial relationship with the service provider. Rather, embodiments described herein enable an account proprietor (or associated entity) to receive payment from the customer in connection with the customer placing the phone call. In this way, service providers get paid from the account proprietor or its partner for fees they generate from their services.

As an addition or alternative, one or more embodiments such as described also enable anyone, including non-members, to use a service without a toll through ad-sponsored phone calls or rebates of long distance charges from long-distance service providers.

According to an embodiment, access to an online resource is enabled by associating a telephony number with a network resource that is made available at a network location, where the network resource is protected so as to be inaccessible without access being provided for users individually. A particular user may be detected in initiating a telephony session using the number. Access to the network resource may be activated or authorized for the particular user in response to detecting the user initiating the telephony session.

As used herein, the term "online resource" or "network resource" corresponds to any content or functionality that is provided at a network location or site. Examples of online or network resources include streaming audio and/or video content, files, online conferencing and desktop sharing, and use of online applications such as word processing applications.

The term "compensatory value" means a value of compensation, such as monetary compensation or alternative forms of compensation, such as credit or exchange value.

Overview

Embodiments described herein recognize that conventional credit-card based payment methods fail to adequately provide for many such online services for reasons that include: (i) customers are not comfortable giving sensitive financial information to unknown service providers, and there are often too many service providers for a customer to establish a direct financial relationship with; (ii) online content or services, such as streaming video, may be time-based and require payments based on the length of the service; and (iii) online content or services may require frequent processing of micro-payments. For instance, watching a movie clip may cost less than one dollar each time. The current credit card services have relatively expensive processing fees and burdensome steps for each transaction.

Embodiments described herein enable use of telephony accounts to automatically authorize and meter access to fee-based online service in real-time. A customer with an account, provided by a payment service in accordance with one or more embodiments described herein, can place a call to a number assigned or otherwise associated with an online service provider. The customer can access content or resources of the service provider during the call or a time period after the call. The customer pays for the online service through the tolls incurred from the phone call. The rate is set by the service's provider on a per-minute or per-call basis. The account proprietor or its partner collects tolls from the customer through pre-paid credits or monthly billing and distributes fees generated from the service to its provider.

While it's possible to implement a similar solution using Web-based authorization, where a user enters an account identification and password to activate a service, the phone-based authorization offers benefits that include, for example, security, simplicity, session control and metering, and audio assistance. The following paragraphs detail some of these benefits.

Security: Customers can require access be made only from an authorized phone number to reduce fraudulent charges. Authentication of the customer identity can be done through a combination of telephone caller ID, SIP ID or a call-back and user-defined PIN.

Simple to use: Making a phone call is easier and faster than entering credit card information or member account information. Customers do not need to sign up and enter account information for different services.

Session control and metering: A phone call offers an easy way to start, meter, and end a session with the service provider. Customers do not have to remember to log out an online session. Metering is performed by a trusted third party and not an unknown service provider.

Audio help: As an alternative or additional feature, audio messages can be played during a phone call to help a customer. The customer can press a key on the phone to be immediately connected to a live operator if necessary. The audio messages can be used for selling and marketing content and services.

Still further, as an additional or alternative feature, a soft-phone client may be used by the customer to support speed dial, call history, free SIP-based calling over the Internet, and other features. In one implementation, the soft-phone client may also be provided by the payment service proprietor or third party for specific support or use with the payment service proprietor or one of the service providers.

As described further, numerous other features and benefits may be provided to both customers and service providers who subscribe to a payment service such as described by one or more embodiments.

One or more embodiments described herein may be implemented using modules. A module may include a program, a subroutine, a portion of a program, or a software component or a hardware component capable of performing one or more stated tasks or functions. As used herein, a module can exist on a hardware component such as a server independently of other modules, or a module can be a shared element or process of other modules, programs or machines. A module may reside and be executed on one machine, such as on a client or on a server, or a module may be distributed amongst multiple machines, such as on multiple clients or server machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Description

FIG. 1 illustrates a system diagram for use with an embodiment of the invention. A system such as shown may be implemented using servers and machines that can communicate across networks such as the Internet. A system of FIG. 1 includes a payment service proprietor 100. The payment service proprietor (PSP) 100 communicates with one or more sites 110 that are accessible over a network such as the Internet for use in accessing resources of a service provider 120 that control the one or more sites 110. The service providers 120 may provide, for example, content (e.g. streaming media), e-commerce, resources or other online services. For brevity, a single online service provider 120 is shown with FIG. 1, although PSP 100 may provide services for numerous other online sites, including online sites of different types (such as merchants and content providers). In this regard, the service provider 120 may provide access to an online resource 142, such as content (e.g. streaming video), files, web functionality (e.g. online conferencing or desktop sharing) or other data available through a web page at a site 110.

In an embodiment, the payment service proprietor (PSP) 100 is provided as a system or combination of modules, including a setup module 102, an activation component 104, and a call handler 106. The service provider 120 (e.g. online merchant) subscribes or registers with the PSP 100 by identifying, among other information, its web site (e.g. network address) and the particular resource or feature that is to be activated with payment provided through the PSP 100. An embodiment of FIG. 2 describes information and selections that the content provider 120 may make in enabling access of its resource 142 in connection with the PSP 100. Once the service provider 120 subscribes, the PSP 100 provides, assigns or otherwise associates the merchant 120 with a telephony (phone) number 125.

A user/customer 132 may operate a terminal 130 to access the online site 110 of the service provider 120. In one embodiment, for example, the online site 110 may provide a web page 122 that makes available a desired resource 142 for the customer. The resource 142 may correspond to, for example, one or more downloadable files (e.g. a media file), functionality, an application or a library of data. The web page 122 may correspond to an entry page, from which the user must first be authorized, before being enabled to access the resource 142. The authorization is provided in part from the PSP 100. In one implementation, the user is prompted to select access to the resource 142 by display of a message and/or graphic (e.g. icon) on web page 122. The web page 122 may also be used to communicate the phone number 125 that is associated with the site 110 or for enabling the user/customer 132 to have access to the desired resource 142 and to make payment for accessing that resource.

According to an embodiment, the phone number 125 is displayed or otherwise made available in response to a specific activity of the user when interacting with the webpage 122. Examples of such activity include the user requesting, at web page 122, access to a pay-restricted portion of the site, or the user requesting to download a file.

In an embodiment, the user elects to receive the resource 142 by placing a call to the PSP 100. The user may place the call when the site 100 or the page 122 is accessed. The call may be placed using any convention telephone network 135, such as provided through Public Switch Telephony Networks, cellular networks, Voice-Over-IP telephony services, and even voice services provided with proprietary networks such as SKYPE. The user may operate a telephony device 136 to place the call. The telephony device 136 may correspond to a traditional telephonic device, cellular handset, or telephony software which may be installed and operable from the user's terminal. In each case, the user may place a call by dialing the number 125 displayed on the page 122. When the call connect occurs, the user may identify the code 127 that was displayed in connection with the number and resource 142. The code 127 may subsequently be used to identify the terminal session of the user.

In placing the call, the user may utilize a pre-existing account that charges the user for telephone calls based on a variety or factors, including the number dialed by the user, whether the user is dialing long-distance, or whether the user dials a number with a specialized pre-fix that has an added cost. As an alternative or addition, the operator of the telephony network 135 may communicate with the caller to seek permission for a charge. In either case, an embodiment leverages a situation where the operator of the telephony network 135 and the user have an established or trusted relationship that enables the user to avoid entering financial information (e.g. credit cards). An embodiment such as described with FIG. 3 describes steps that may be performed by the user in order to receive benefit of PSP 100, including when making the phone call for access and/or payment.

Once the user places the call, an embodiment provides that the call handler 106 provides or communicates with the receiving end of the call. In one embodiment, the call handler 106 identifies (i) the number dialed, and (ii) a code entered by the user when the call connect is made. As an alternative or addition, the call handler 106 identifies a number from which the user places the call. While the call is ongoing, the telephony service 135 (or alternatively the PSP) may monitor or track the duration of the incoming call, and the PSP 100 may associate the call (and its duration) with a specific account belonging to the service provider 120. In one implementation, revenue subsequently collected by the operator of the telephone network from the user placing the call is collected by PSP 100 and distributed at least in part to the service provider 120.

In response to being connected, an embodiment provides that the call handler 106 identifies the online site 110 and/or web page 122 that has the resource 142 of the customer's interest. This identification may be established by referencing the dialed number to an identifier of the site 110 or page 122 where the desired resource 142 is located. From the code 127 provided by the customer, and/or the customer's phone number, one or more identifiers 105 of the person/terminal from which the call is made are determined. The activation component 104 may communicate the identifiers in an activation communication 115 to the service provider 120. The activation communication 115 enables the service provider 120 to identify a particular terminal session that receives the authorization. The service provider 120 may then enable the user of terminal 130 to access resource 142. In one implementation, the user's terminal session may make repeated requests for access to resource 142. The requests may be denied until the activation communication 115 is received. A browser or other component (e.g. media player) on the terminal may handle the unlocked content or resource and/or data item.

It should be noted that there may be instances when the user of terminal 130 places the call and receives no authorization. In such case, the activation communication 115 may never be communicated, or may be communicated in the negative. The terminal session of the user may then be denied requests for the resource 142.

One or more embodiments provide that the duration of the user's access to the resource 142 is determined from (i) a duration of the user's call to the PSP 100, and/or (ii) a compensatory or monetary value associated with the user's call. In many cases, the monetary value of the user's call is set by the duration (e.g. the call may be metered). However, the compensatory or monetary value may also be set by the user placing a long distance call. Still further, the user may be charged a flat fee for the call and receive some value (as measured in duration) for example, for use in receiving or having access to restricted resources at the service provider 120.

In an embodiment, the activation component 104 may also signal an agent 121 of the service provider that interfaces and handles communications with the PSP. The communication to the agent 121 may cause the service provider 120 to terminate the authorization or access to resource 142. In one embodiment, the user may hang-up on a connected call, and the activation component signals the termination in response to the hang-up. In such an embodiment, the user's duration for receiving or otherwise having access to the resource 142 is tied to the duration that his call is connected (e.g. his call may be metered by the minute). Still further, other embodiments contemplate, for example, use of timers at the site of the service provider 120 that terminate the authorization to the resource 142 a set time after access was granted, or a set time after receiving an activation communication 115.

Methodology

Figure 2:
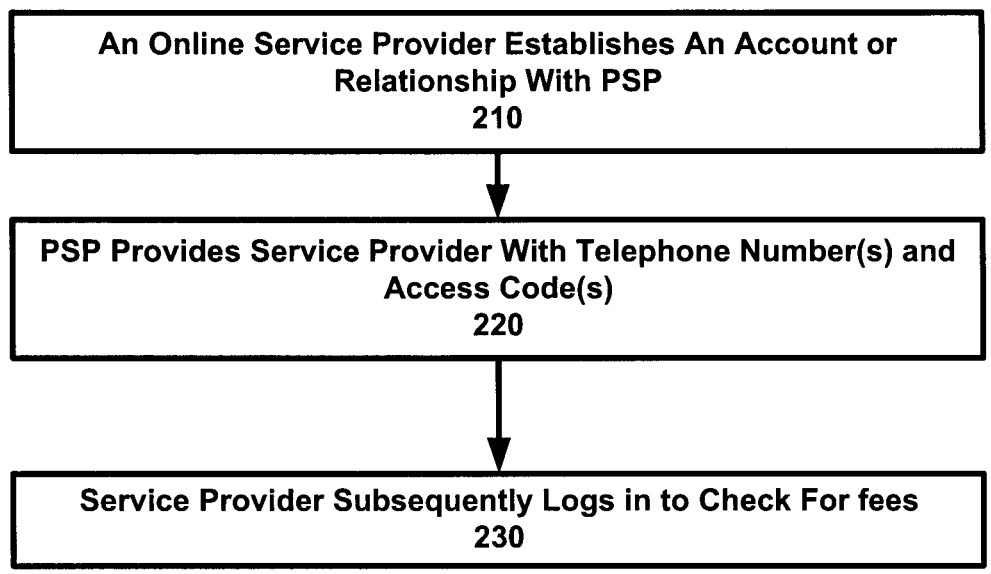
FIG. 2 illustrates a method by which online service provider may sign up with a payment service proprietor to create a provider account that allows the online service provider to accept payments made through the payment service, under an embodiment of the invention.

FIG. 2 illustrates a method by which online service provider may sign up with a payment service proprietor to create a provider account that allows the online service provider to accept payments made through the payment service, under an embodiment of the invention. In describing a method of FIG. 2, reference is made to elements described with a system of FIG. 1, for purpose of illustrating components or modules for performing a step, or sub-step being described.

In a step 210, the online service provider establishes an account or relationship with the PPS 100. In establishing the relationship, the service provider 120 may specify various account-specific items, including an identifier for the network resource. These data items include an entry URL or other identifier that identifies a specific resource 142, or for a class of resources. The identifier may be associated with a phone number that is then communicated to the service provider 120. The service provider 120 may receive multiple phone numbers for different sites, or classes of network resources. For example, under one implementation, some media files may be charged at a higher rate, and the service provider may specify to receive separate phone numbers.

In one implementation, the service provider 120 may also specify a termination URL that specifies the network location or identifier that is used when access to a specific resource 142 is terminated. In such an implementation, the PSP 100 specifies the entry URL when the call from the user is made to the telephone number associated with the entry URL. The PSP 100 may then specify the termination URL when the call is over. Thus, the use of the entry and termination URL serve to identify activation and termination actions for a particular network resource. The specific terminal session that is affected may be identified from code that is displayed to the user in connection with that user viewing the entry URL.

In one implementation, the service provider 120 may specify whether the payment service is to be metered or flat-rate, a per-minute rate for a metered service, and a per-call rate and expiration time period for a flat rate service. As an option, an embodiment provides that voice messages may be played to the caller when the call is connected. Based on, for example, input from the service provider 120, the voice messages can be programmed to dynamically change based on the content the customer is viewing. Still further, based on input, requests or other information, the PSP 100 may provide the service provider with optional phone numbers for when the customer requests to talk to a live operator.

With the account setup, step 220 provides that the PSP 100 provides the service provider 100 with a telephone number and optional access codes for individual service items (i.e. each resource that is accessed by an individual user). As an addition or alternative, the PSP 100 may provide the service provider 120 with a user-interface feature that links or specifies a request by the customer to the service provider 120 or PSP 100. The feature may be placed on the entry page the resource 142 or elsewhere in connection with where payments are to be charged from the user.

In step 230, after the relationship is established and the service provided, the service provider 120 can login to their account with the PSP 100 to check the fees they have generated from their services. Various fee sharing or compensatory models may be used to distribute monies or other compensation from the content provider 120 to the PSP 100. For example, the PSP 130 may deduct a service fee and send the remaining fees monthly to the service provider.

An embodiment such as described with FIG. 1 and FIG. 2 may provide several benefits to service providers 120, such as merchants and vendors of content. Among these benefits, online sites and service providers do not need to establish a financial relationship with a customer and manage sensitive financial information. Online sites and service providers get payments directly from the payment service proprietor and do not need to handle billing and fee collections. Still further, service providers 120 may (i) generate additional revenues by allowing customers to use the service without entering credit card information, (ii) have more flexibility in pricing their services through pay-per-call or pay-per-minute metered services, (iii) reduce transaction fees and accept micro-payments, and (iv) provide audio help, sales and marketing messages to the customer during an online session.

Figure 3:
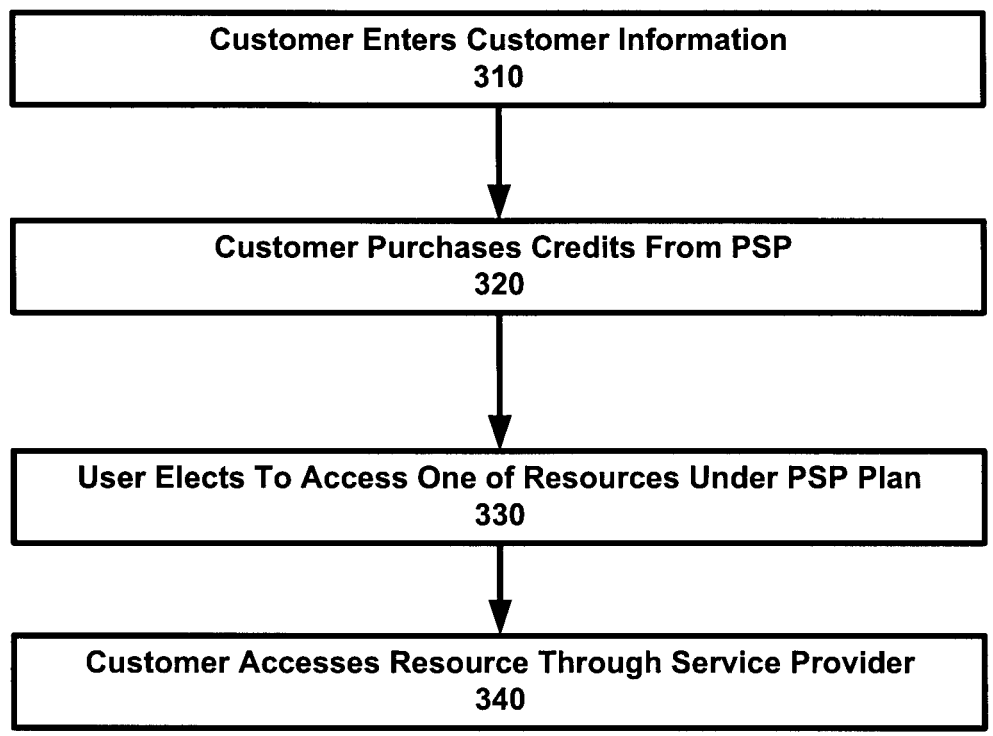
FIG. 3 illustrates a method by which a customer may sign-up with payment service proprietor to create a customer account, and then subsequently use the PSP 100, under an embodiment of the invention.

FIG. 3 illustrates a method by which a customer may sign-up with PSP 100 to create a customer account, and then subsequently use the PSP 100, under an embodiment of the invention. In describing a method of FIG. 3, reference is made to elements described with a system of FIG. 1, for purpose of illustrating components or modules for performing a step, or sub-step being described.

In step 310, the an embodiment provides that the customer enters information for his or her account. In one embodiment, customer may enter phone numbers authorized to activate services and indicates if the activation has to be done through one of the phone numbers. The customer may set a PIN for access authorization. The customer may also use a SIP-based softphone with a unique ID to place calls directly from his PC provider account that allows the online service provider to accept payments made through the payment service, under an embodiment of the invention.

Under one embodiment, step 320 provides the customer with an option to purchase credits. For example, a customer can purchase pre-paid credits from the PSP 100r or its partner or be billed monthly based on the actual usage. The credits may be used to pay for online services offered from any service providers that accept the payment service. As an alternative or addition, the customer may be charged for use of PSP 100 through its regular telephony account.

After the account is established, step 330 provides that a user elects to access one of many possible resources 142 provided with one of the service providers 120 who subscribe to PSP 100. One or more embodiments provide that when the customer activates a user-interface feature (e.g. icon or soft button) on a site where the PSP 100 services are offered, an onscreen message is displayed asking the customer to call in to a telephone number. The customer may also be prompted to provide an access code that is displayed to the customer, and which serves to uniquely identify the customer's terminal session from other terminal sessions to the site. Alternatively, an embodiment provides that customer can request a call-back to a phone number. The customer may then be prompted to enter a PIN and proceed to access the online service.

According to an alternative embodiment, an icon or other feature may be selected by the customer from the site of the service provider 120 to trigger a call to be placed by the customer's softphone. The softphone may be integrated with the terminal 130 (which may correspond to a personal computer). The softphone client, or a website operated by the payment service proprietor, may also enable the customer to launch supported services and the associated call and payment Step 340 provides that the customer accesses the resource 142 through the service provider. Depending on an implementation used, the customer can access the resource 142 only during the call (metered service), or for a time period after the call (flat-rate service). For metered services, the customer may hear audio messages from the telephone while using the service. The audio messages can be context sensitive and relevant to the particular service that the customer is using. The customer may also be given the option to connect to a live operator by pressing a phone key. Various other usage scenarios and implementations are also possible.

Under step 350, the customer terminates the session. According to an embodiment, the customer may simply hang-up the phone (or terminate the telephony session) to terminate a metered service. The customer may then be informed of the length of the call and the fees incurred. As an addition or alternative, a flat-rate service automatically terminates when the pre-set time period expires. Still further, an embodiment provides that the customer may be charged per-minute tolls for a metered session or per-call tolls for a flat-rate session. The customer pays for the session through pre-paid credits or monthly payments to the payment service proprietor.

Under a method such as described with an embodiment of FIG. 1 and FIG. 3, numerous benefits are offered to customers. Among them, embodiments provide that customers are not required to establish a separate financial relationship with each service provider 120. Additionally, one or more embodiments provide that customers can activate an online session with a simple phone call and terminate the session by hanging up the phone. Still further, customers may have added security against fraudulent charges by requiring session activations must be made from an authorized phone number. As another addition or alternative, customers may have more assurance of the accuracy of the billing as the metering and payment calculations are done by the payment service proprietor and not the online service provider. And customers can hear audio help, sales and marketing messages from the telephone and can press a key on the phone to be connected to a live operator.

Figure 4:
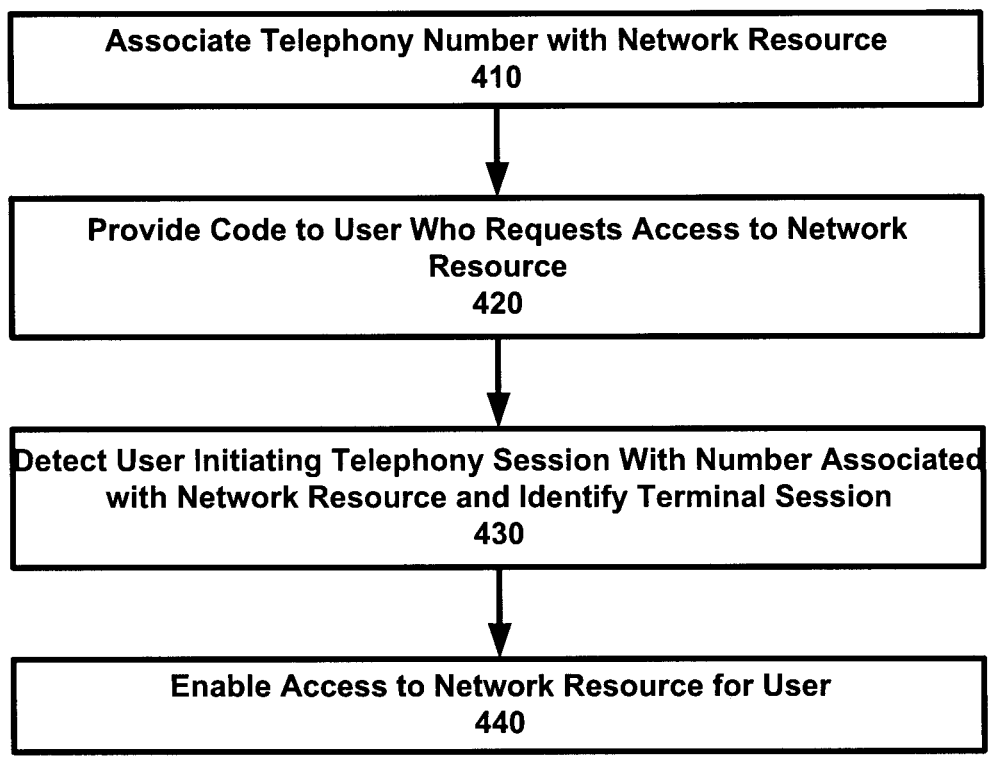
FIG. 4 illustrates a computer-implemented method for enabling a content provider to authorize or activate access to a protected resource through use of a payment service proprietor, under an embodiment of the invention.

FIG. 4 illustrates a computer-implemented method for enabling a content provider to authorize or activate access to a protected resource through use of a payment service proprietor, under an embodiment of the invention. In describing a method of FIG. 2, reference is made to elements described with a system of FIG. 1, for purpose of illustrating components or modules for performing a step, or sub-step being described.

Step 410 provides that the service provider 120 associates a telephony number with a corresponding network resource 142. As described with an embodiment of FIG. 2, for example, the service provider 120 may be provided the number when entering information in establishing or maintaining an account with PSP 100.

Step 420 provides that a code 127 is provided to the user who requests access to the network resource. In one implementation, the code 127 serves to identify the user's terminals session for the service provider 120. As described with an embodiment of FIG. 2, for example, the code 127 may be provided from PSP 100.

In step 430, the user is detected when he or she initiates the telephony session with the number provided with the desired resource 142. For example, the user may load the web page 122, and the service provider 120 may display the number on an icon or other feature in association with requiring access to the resource 142. The user may dial the number. At the time the user accesses the page 122, one implementation provides that the PSP agent 121 on the service provider 120 may repeatedly poll or request from the PSP 100 for identifiers of individuals who have dialed one of the telephone numbers assigned to that service provider 120. In one implementation, the terminal session of the user requests access to the resource 142. The agent 121 may then check with the PSP 100 to determine whether a caller with an identifier that matches the terminal session identifier has placed the call and been approved by the PSP 100. The PSP 100 may return the reply affirmatively when the call is placed and approval occurs. The terminal session identifier may be matched to the caller by, for example, the caller entering the code 127 which is displayed on page 122 for that caller's terminal session.

Upon approval from PSP 100, step 440 provides that the service provider 120 may release or authorize access to the resource 142 for the particular user (or terminal session).

Payment Free Alternatives

Instead of requiring a customer to have a member account with the payment service proprietor, embodiments enable anyone, including non-members, to activate a session without having to pay the content or service provider but still generating revenue to be split between such provider and the payment service proprietor. There are at least two ways to fund such payment-free sessions:

First, the payment service proprietor can assign a long-distance number to a customer, which will incur a long distance charge from the customer's telephone service provider. The payment service proprietor may receive rebates of the long distance charges from the telephone service provider.

Second, the payment service proprietor can play audio ads from sponsors in the phone call. Customers may be asked to press a phone key from time to time to continue an ad-sponsored session.

Other Alternatives and Variations

Although embodiments described above provide for the use of a phone, it is easy to generalize the method to use a VoIP service, such as Skype, to make a call. An online service can use a VoIP service account ID for service activation in addition to using a phone number.

Under an embodiment, an online service that includes telephony payments as described can be delivered to the same mobile phone or device that the service activation call is made via a separate data channel.

As another embodiment, a payment service provider can provide or list multiple phone numbers for a single online service. The customer has the option to choose a local phone number to call to eliminate long distance charges.

To reduce the chance of leaving a metered session open accidentally, an embodiment provides that the payment service proprietor may prompt a customer to press a key to continue a session from time to time and automatically terminate a session if the customer doesn't respond.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for enabling access to an online service, the method comprising:

receiving, by a first microprocessor, based on a particular user interaction with a webpage, a selection of an online network resource, wherein the particular user interaction is from a user terminal;

associating, by the first microprocessor, a telephony number and a session code with the online network resource;

transmitting, by the first microprocessor, the telephony number and the session code to the user terminal;

detecting, by a second microprocessor, that the particular user has initiated a voice telephony session using the telephony number;
determining, by the second microprocessor, that the telephony number is associated with the online network resource;
receiving, by the second microprocessor, the session code in the voice telephony session;
authenticating, by the second microprocessor, the session code;
activating, by the second microprocessor, access to the online network resource, in the voice telephony session, for the particular user, in response to authenticating the session code;
detecting, by the second microprocessor, that the source telephony session has ended; and
in response to detecting that the voice telephony session has ended, disabling, by the second microprocessor, access to the online network resource; and
accruing, by the second microprocessor, a cost to the particular user for activating access to the voice telephony session based at least in part on a duration of the voice telephony session.

2. The method of claim 1, further comprising detecting, from data provided by the online network resource and during the voice telephony session, the particular user for which access to the online network resource is to be activated.

3. The method of claim 2, wherein the detected data corresponds to a personal identifier associated with the particular user that is entered by the particular user during the voice telephony session.

4. The method of claim 1, further comprising accruing a cost to the particular user for activating access to the voice telephony session based at least in part on the telephony number called by the particular user and the session code entered by the particular user.

5. The method of claim 1, further comprising displaying the telephony number and the session code on the user terminal that also provides access to the online network resource.

6. The method of claim 5, wherein a combination of the telephony number and the session code is specific to one of (i) the online network resource, (ii) the terminal, or (iii) the particular user.

7. A system for enabling access to an online network resource, the system comprising:
a first processor enabled server, wherein the first processor enabled server;
receives, based on a particular user interaction with a webpage, a selection of an online network resource, wherein the particular user interaction is from a user terminal;
associates a telephony number and a session code with the online network resource; and
transmits the telephony number and the session code to the user terminal; and
a second processor enabled server, wherein the second processor enabled server;
detects that the particular user has initiated a voice telephony session using the telephony number;
determines that the telephony number is associated with the online network resource;
receives the session code in the voice telephony session;
authenticates the session code;
activates access to the online network resource, in the voice telephony session, for the particular user, in response to authenticating the session code;
detects that the voice telephony session has ended; and
in response to detecting that the voice telephony session has ended, disables access to the online network resource;
performs one of (i) accruing compensatory value from the particular user placing the voice telephony session, or (ii) playing a commercial message to the particular user during the voice telephony session.

8. The system of claim 7, wherein the one or more modules display, or communicate data for display, corresponding to the telephony number.

9. The system of claim 8, wherein the one or more modules determine the particular user by identifying the session code during the voice telephony session.

10. The system of claim 9, wherein the identity of the particular user is communicated to a service provider to enable the service provider to identify the voice telephony session of the particular user that is to have access to the online network resource.

11. A method for generating compensatory value for providing access to an online network resource, the method comprising:
assigning, by a first microprocessor, a telephony number and a session code to the online network resource;
receiving, by a first microprocessor, based on a particular user interaction with a web page, a selection of an online network resource, wherein the particular user interaction is from a user terminal;
associating, by the first microprocessor, the session code with the user terminal;
transmitting, by the first microprocessor, the telephony number and the session code to the user terminal;
determining, by a second microprocessor, that the telephony number has been used to establish a voice telephony session between the particular user and a payment service provider;
receiving, by the second microprocessor, the session code in the voice telephony session;
authenticating, by the second microprocessor, the session code;
activating, by the second microprocessor, access to the online network resource, in the voice telephony session, for the particular user, in response to authenticating the session code;
detecting, by the second microprocessor, that the source telephony session has ended;
in response to detecting that the voice telephony session has ended, by the second microprocessor, access to the online network resource; and
performing, by the second microprocessor, one of (i) accruing compensatory value from the particular user placing the voice telephony session, or (ii) playing a commercial message to the particular user during the voice telephony session.

12. The method of claim 11, wherein accruing compensatory value from the particular user is based in part on accruing for the voice telephony session as a long distance charge.

13. The method of claim 1, further comprising:
detecting that the particular user is viewing content of the online network resource; and providing one or more voice messages, via the voice telephony session, based on the content the particular user is viewing of the online network resource.

* * * * *

UNITED STATES PATENT AND TRADEMARK OFFICE
CERTIFICATE OF CORRECTION

PATENT NO. : 9,785,927 B2
APPLICATION NO. : 11/934735
DATED : October 10, 2017
INVENTOR(S) : Shenchang Eric Chen et al.

Page 1 of 1

It is certified that error appears in the above-identified patent and that said Letters Patent is hereby corrected as shown below:

In the Claims

At Column 11, Line 15, please delete "source" and replace it with "voice" therein.

At Column 12, Line 49, please delete "source" and replace it with "voice" therein.

At Column 12, Line 52, after "has ended," please insert --disabling-- therein.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*